(12) United States Patent
Noga (10) Patent No.: US 9,319,080 B1
(45) Date of Patent: Apr. 19, 2016

(54) DETECTION-ENHANCED ADJUSTABLE BANDWIDTH CIRCUIT

(71) Applicant: THE UNITED STATES OF AMERICA AS REPRESENTED BY THE SECRETARY OF THE AIR FORCE, Washington, DC (US)

(72) Inventor: Andrew J. Noga, Rome, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 14/594,241

(22) Filed: Jan. 12, 2015

(51) Int. Cl.
*H04B 1/10* (2006.01)
*H04B 1/12* (2006.01)

(52) U.S. Cl.
CPC ............. *H04B 1/1036* (2013.01); *H04B 1/12* (2013.01)

(58) Field of Classification Search
CPC ................ H04L 25/03038; H04L 27/2647; H04B 1/7085; H04B 1/707

USPC .................... 375/350, 259; 333/202; 708/404
See application file for complete search history.

(56) References Cited

U.S. PATENT DOCUMENTS

| | | | | |
|---|---|---|---|---|
| 5,257,211 A | * | 10/1993 | Noga | G01S 7/021 342/91 |
| 6,128,334 A | * | 10/2000 | Dapper | H04H 20/36 370/265 |
| 7,548,187 B1 | * | 6/2009 | Laste | G01S 13/5244 342/104 |
| 2010/0182318 A1 | * | 7/2010 | MacInnis | G09G 5/363 345/428 |

* cited by examiner

*Primary Examiner* — Khai Tran
(74) *Attorney, Agent, or Firm* — Joseph A. Mancini (57) ABSTRACT

A circuit apparatus and method for providing spectrum sensing. The invention accepts as inputs actual real-world signals in which the resulting two-dimensional output representation provides useful characteristics or features of the original time/series signal being analyzed. The invention employs both time and frequency averaging to exploit signal persistence in either domain.

10 Claims, 10 Drawing Sheets

DETECTION-ENHANCED ADJUSTABLE BANDWIDTH CIRCUIT

STATEMENT OF GOVERNMENT INTEREST

The invention described herein may be manufactured and used by or for the Government for governmental purposes without the payment of any royalty thereon.

BACKGROUND OF THE INVENTION

Energy detector-based spectrum sensing is typically implemented using the periodogram. By including the time dimension, an image can be formed from consecutive periodograms referred to as the spectrogram. Such time-varying spectral representations are needed to address the dynamics of the signal environment in spectrum sensing applications. As indicated in reference [3] below, challenges associated with traditional implementations of energy detection schemes include: i) selection of the threshold for detecting primary users, ii) inability to differentiate interference from primary users and noise, and iii) poor performance under low signal-to-noise ratio (SNR) conditions.

In this sense, the spectrogram, which is referenced widely in the open literature, could be thought of as "prior art". More appropriately, it would be the spectrogram combined with Welch's method of time averaging [4]. Also included in the prior art is the Adjustable Bandwidth Concept [1], which extends Welch's method to include the ability to average over frequency, and allows for operation on log-scaled amplitudes in the input spectrogram.

OBJECTS AND SUMMARY OF THE INVENTION

The purpose of the present invention is to provide a circuit apparatus and method for constructing time-frequency representations (or other two-dimensional inputs) which are characterized by the bandwidths or persistence of the multitude of components that can comprise the original two-dimensional representation. In short, the present invention accomplishes this by generating M additional two-dimensional representations based on an input two-dimensional representation.

One object of the present invention is to provide a circuit apparatus and method for detecting electronic signals.

Another object of the present invention is to provide a circuit apparatus and method for detecting interfering electronic signals.

Still another object of the present invention is to provide a circuit apparatus and method that separates signal components according to their bandwidth.

Still yet another object of the present invention is to provide a circuit apparatus and method that performs both time and frequency averaging to increase detection and reduce false-alarm probabilities.

Still yet another object of the present invention is to provide a circuit apparatus and method for processing acquired real signals from analog-to-digital converters.

Still yet another object of the present invention is to provide a circiut apparatus and method that creates displayable output signals for a human operator.

Still yet another object of the present invention is to provide a circiut apparatus and method that creates control signals for controlling parameters in external real systems.

Briefly stated, the present invention provides a circiut apparatus and method for spectrum sensing. The invention accepts as input a real, time-varying analog signal and outputs a spectrogram of the original time/series signal being analyzed. The invention employs both time and frequency averaging to exploit signal persistence in either or both domains.

INCORPORATED BY REFERENCE

[1] A. J. Noga, "Adjustable Bandwidth Concept (ABC) Performance Evaluation," AFRL-IF-RS-TR-2003-184, July 2003.

[2] L. Galleani, L. Cohen, A. J. Noga, "A Time Frequency Approach to the Adjustable Bandwidth Concept," Elsevier Journal on Signal Processing, August 2006.

[3] T. Yucek, H. Arslan, "A Survey of Spectrum Sensing Algorithms for Cognitive Radio Applications," IEEE Communications Surveys & Tutorials, Vol. 11, No. 1, First Quarter 2009.

[4] P. D Welch, "The use of Fast Fourier Transform for the Estimation of Power Spectra," IEEE Trans. Audio Electroacoust., Vol. AU-15, June 1967, pp. 70-73.

DETAILED DESCRIPTION OF THE PREFERRED EMBODIMENT

Figure 1:
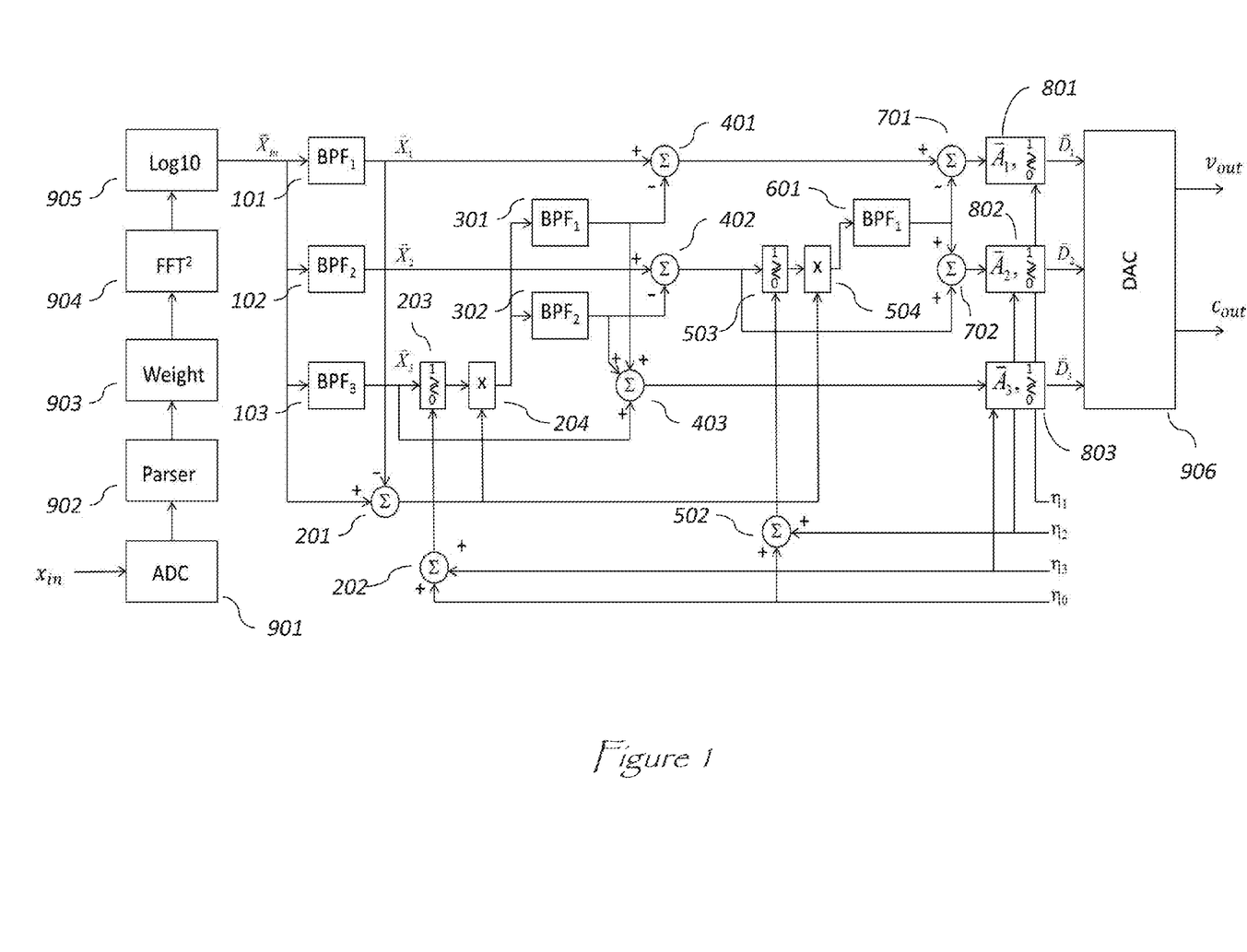
FIG. 1 depicts a functional block diagram of the present invention, a detection-enhanced adjustable bandwidth circuit apparatus.

Referring to FIG. 1, the present invention, a Detection-Enhanced Adjustable Bandwidth (ABC++) circuit apparatus is depicted. Briefly, the invention comprises a front end which converts analog signals such as those occurring in free space into a digital domain suitable for subsequent processing by the invention. The preferred embodiment of the circuit apparatus comprises analog-to-digital and digital-to-analog converters, special-purpose hardware, high-speed programmable gate-arrays, and high-speed digital signal processors to achieve the same signal processing utility without being dependent on a computer. Alternatively, signal processing stages may be performed by a computer running a computer software program which executes a sequence of computer performed steps. The invention converts the results of the aforesaid processing into analog outputs comprising voltage and control signals required to drive graphical displays for the presentation of time-frequency representations of the original input analog signal.

Still referring to FIG. 1, to achieve the Power Spectral Density (PSD) of a real signal in free-space, $x_{in}$, the signal is first sampled by an Analog-to-Digital Converter (ADC) 901, parsed into sequential vectors of length N samples in Parser 902, optionally weighted by a weighting data window such as a Hanning window in Weight 903, transformed via a fast Fourier transform and squared in $FFT^2$ 904, and then compressed in amplitude by logarithmic compression in Log10 905. The invention next processes sequential vectors of digital spectral data, $\vec{X}_{in}(n)$, over the segment index, n. The N elements of the input vector can also be derived from an external process that estimates the Power Spectral Density (PSD) of a data sequence to be processed by the present ABC++ invention. When for example, the data sequence is a function of time, an increase in the segment index corresponds to an increase in time, and the overall sequence of PSD estimates provides a two-dimensional representation of the variations in spectral content of the data sequence over time and frequency. The ABC++ device is an M-stage process, M>1, which generates M additional two-dimensional representations from the input two-dimensional representation. Although a common application of the ABC++ device will be for automated signal energy detection, other applications can be anticipated where two-dimensional matrices of data such as images are to be analyzed. For the purposes of this description, the signal energy detection from real world analog signals application of the invention is assumed.

Still referring to FIG. 1, an N-element data vector, $\vec{X}_{in}$, is filtered over elements k=1,2, ... N, through a parallel set of M Band-pass Filters 101, 102, ..., 103. The resulting set of M vectors are designated as $\vec{X}_1, \vec{X}_2, ... \vec{X}_M$, each also consisting of N-elements. In prior art without detection enhancement, these vectors would then be processed by Ensemble Averagers, $\vec{A}_1, \vec{A}_2, ... \vec{A}_M$, respectively. Each averager performs an ensemble average over $K_i$ segments, for any given stage, i. After averaging over consecutive segments, the resulting vectors can then be compared to thresholds $\eta_1, \eta_2, ... \eta_M$ respectively, resulting in the binary-valued detection vectors, $\vec{D}_1, \vec{D}_2, ... \vec{D}_M$. For the energy detection application of the device, components 101, 102, ..., 103 each accomplish a weighted average over the frequency dimension, and Ensemble Averager/Detectors 801, 802, ..., 803 each accomplish an average over the time segment dimension. Generally, the parameters of the filters and averagers are chosen to provide more frequency filtering and less time averaging in earlier stages. Likewise, less frequency filtering and more time segment averaging is provided in later stages. Here, the terms earlier and later are used in reference to the stage number and are not in reference to time.

The parameters of the Band-Pass Filters 101, 102, ..., 103, are chosen to achieve unity gain in their pass-bands, and to ensure the perfect reconstruction property, $$\vec{X}_{in}(n) = \sum_{i=1}^{M} \vec{X}_i(n).$$

Figure 2:
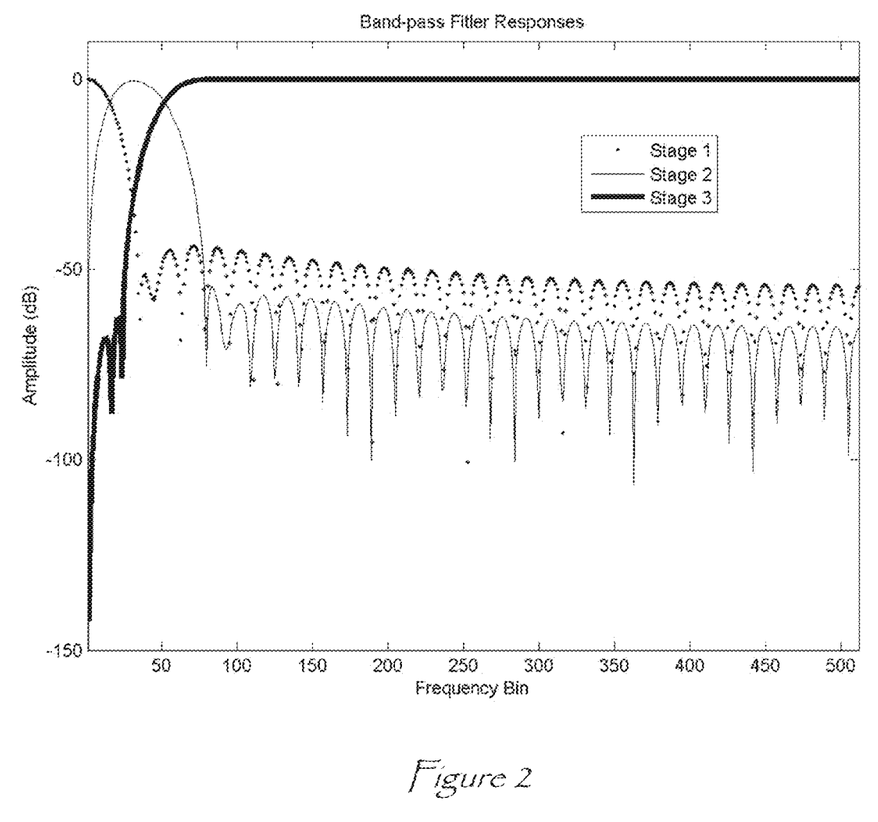
FIG. 2 depicts band-pass filter responses of the present invention.

For many useful data sequences of interest, the convolutions of the input data vector with the filters can be implemented as circular convolutions, leveraging fast transformation algorithms such as the Fast Fourier Transform (FFT). By choice of filter coefficients, each filter can then be designed to achieve zero delay over frequency elements to maintain correspondence between the elements of the input vector and the output vectors. In the original patent, the same processing effect was accomplished using a set of M low-pass filters, one per stage, and configuring the connections between stages to achieve this alignment between input and output vectors. A representative set of magnitude responses for the Band-pass Filters 101, 102, ..., 103 (as depicted in FIG. 2), for the case of M=3 stages. Note that strictly speaking, the first stage filter is actually low-pass in nature, and the last stage filter will be high-pass, but herein, we are generally referring to each filter as a band-pass filter. Note also that the coefficients for these filters can be derived from the low-pass filters of the configuration described in U.S. Pat. No. 5,257,211, incorporated herein by reference. In this case, each low-pass filter is chosen to provide an integer valued delay over frequency elements, to more easily achieve input and output vector alignments. The length of the filters in this mathematically equivalent original configuration directly corresponds to the amount of frequency averaging accomplished in each stage, as described in the original patent.

Detection enhancement is accomplished by taking advantage of the characteristics of the spectral components that occur in stages 1 through i-1, relative to stage i. The Band-pass Filters 101, 102, ..., 103, are designed to sort the spectral content of the input vector, $\vec{X}_{in}$, based on bandwidth. Therefore, the spectral components contained in $\vec{X}_1$ are more persistent over the frequency dimension relative to components in $\vec{X}_2, \vec{X}_3, ... \vec{X}_M$ In general, the spectral components of $\vec{X}_i$ are more persistent over the frequency dimension relative to components in $\vec{X}_{i+1}, \vec{X}_{i+2}, ..., \vec{X}_M$. Conversely, this implies that due to relatively less persistence, the spectral components of $\vec{X}_i$ behaved as nascent Kronecker delta sequences in the Band-pass filters of stages 1 through i-1. As a result, these nascent Kronecker delta sequences elicited responses in these Band-pass Filters that are a function of the impulse response of the filters. Furthermore, due to the perfect reconstruction property of the set of Band-pass Filters, negated versions of these undesired responses are then present in stage i. This cross-contamination between stages is a natural consequence of the perfect reconstruction property, combined with the non-ideal nature of practical filters. To achieve perfect reconstruction with practical filters, overlap between frequency responses will occur and lead to useful but imperfect separation of signal components.

Still referring to FIG. 1, detection enhancement is accomplished by a series of additional processing steps after the initial set of Band-pass Filters 101, 102, ..., 103. Subtractor 201 forms the difference of the vector, $\vec{X}_{in}$, minus the output vector of Band-pass Filter 101. Summer 202 sums the scalar threshold parameters, $\eta_0$ and $\eta_M$. The output vector from the stage M Band-pass Filter 103 is processed by Detector 203 using as a threshold the output of Summer 202. Detector 203 compares each element of the input vector to the scalar sum threshold $\eta_M + \eta_0$ from 202 and creates a new vector with elements of value 1 or 0. For elements of the input vector that are greater than or equal to the threshold, the corresponding element of the output vector is 1. Otherwise, the output vector elements are 0. The Detector 203 output vector and the output vector of Subtractor 201 are multiplied element by element in Multiplier 204. The resulting output vector from 204 is then filtered over the frequency dimension, i.e., over the elements of the vector, in Band-pass Filters 301, 302, ... 303. The parameters of filter 301 are identical to those of filter 101, the parameters of filter 302 are identical to those of filter 102, and so on. The output vectors of Band-pass Filters 301, 302, ..., 303 are summed with the output vector of Band-pass Filter 103, in Summer 403. The output vector of Summer 403 is now a final corrected version of the vector $\vec{X}_M$.

In preparation for final corrections to vector $\vec{X}_{M-1}$, Subtractor 401 forms the difference of the output vector of Band-pass filter 101 minus the output vector of Band-pass Filter 301. Likewise, Subtractor 402 forms the difference of the output vector of Band-pass Filter 102 minus the output vector of Band-pass Filter 302. These difference vectors are formed for the first M−1 stages. In this manner, the perfect reconstruction property is maintained across the output vectors of Subtractors 401, 402, and Summer 403, and these output vectors have been corrected based on detections from stage M. In the next step, final corrections are made to stage M−1, and initial corrections are made to stages 1 through M−2, based on detections from stage M−1 using threshold $\eta_{M-1}+\eta_0$. These final and initial correction processes continue likewise for stages M−1 to 2. The correction process is completed when stage 2 detections are used to correct stages 1 and 2.

Still referring to FIG. 1, Summer 502 forms the sum of the scalar $\eta_2$ and $\eta_0$ for the threshold of Detector 503. The current version of the corrected vector $\vec{X}_2$ from the last Subtractor in stage 2 is compared element by element to this threshold and creates a new vector with elements of value 1 or 0. For elements of the input vector that are greater than or equal to the threshold, the corresponding element of the output vector is 1. Otherwise, the output vector elements are 0. Multiplier 504 performs an element by element multiply of the detection vector from Detector 503, with the output difference vector of Subtractor 201. The output vector of Multiplier 504 is filtered over elements by Band-pass Filter 601. In Summer 702, the output vector of Band-pass Filter 601 is summed with the current version of the corrected vector $\vec{X}_2$ from the last Subtractor in stage 2. The output of Summer 702 is the final corrected version of $\vec{X}_2$. Finally, Subtractor 701 forms the difference of the most recent corrected version of $\vec{X}_1$ minus the output vector of Band-pass Filter 601. All final corrected versions of vectors $\vec{X}_1, \vec{X}_2, \ldots, \vec{X}_M$ are then independently averaged over the time dimension in Ensemble Averager/Detectors 801, 802, ..., 803 as described for the prior art. Although detection vectors are shown at the outputs of Averager/Detectors 801, 802, ..., 803, resulting vectors from the ensemble averages can also be output for further external processing and analysis.

Digital-to-Analog Converter 906 creates real, continuous-time signals from the detection or average vectors from 801, 802 and 803. These real output signals, $v_{out}$ and $C_{out}$, are the output video and control signals respectively. These signals are used in external devices for display to a human operator, and for control of parameters of external devices.

To demonstrate the effectiveness of the ABC++ process, comparisons to the conventional ABC process of U.S. Pat. No. 5,257,211 can be made using a two-dimensional input which by design, contains signal components of multiple bandwidths. The signal simulations and results were obtained using Matlab™. For the results presented, both the ABC and ABC++ were 3-stage processes, i.e., M=3, configured with the same Band-pass filters 101, 102 and 103 parameters. The band-pass filter parameters were derived from the equivalent low-pass ABC implementation. These low-pass filter parameters were created using the Matlab fir1 command, as fir1(64, .01) and fir1(64,.1) for stage 1 and stage 2 respectively. The corresponding band-pass filter responses are shown FIG. 2. No time averaging was used in the results presented, i.e., the selected parameters of the averagers are $K_1=1$, $K_2=1$ and $K_3=1$.

Figure 3:
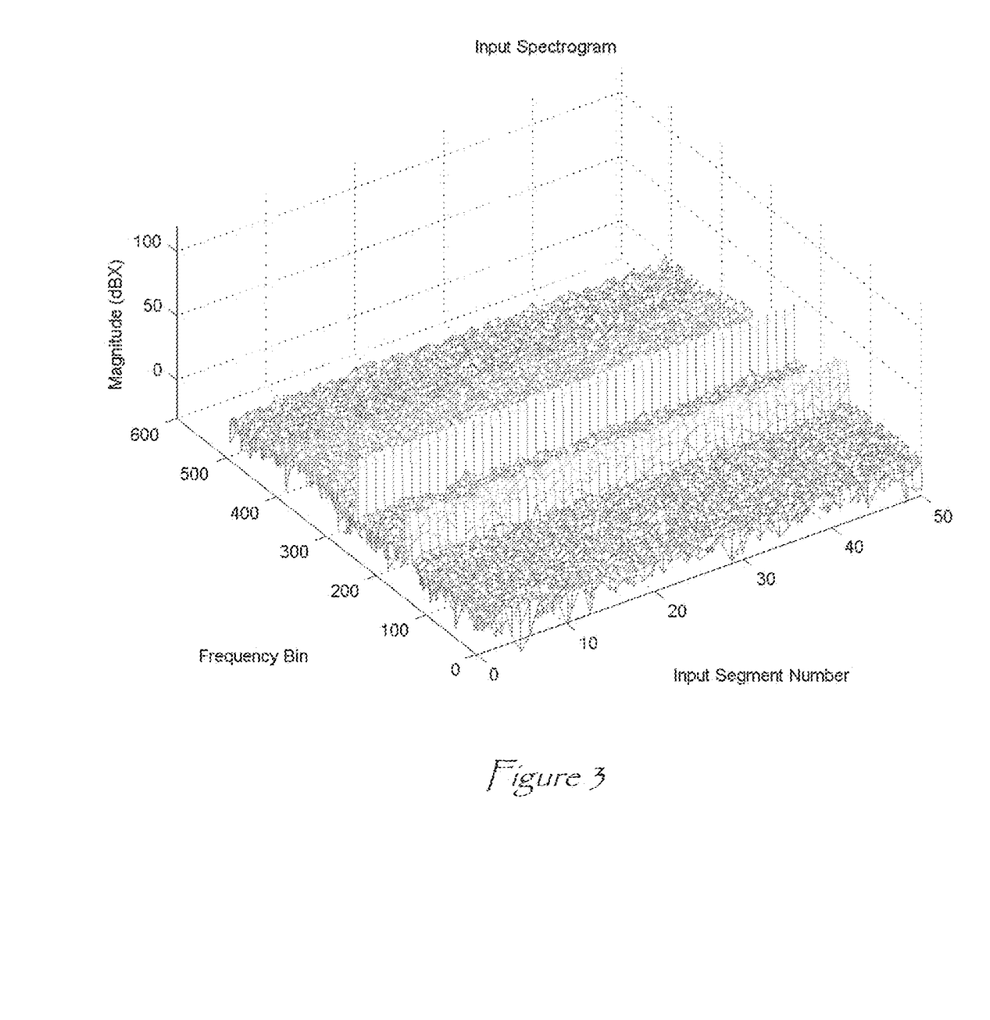
FIG. 3 depicts a spectrogram of a three-component test signal in noise as a two-dimensional input to the present invention.

For the demonstration, the two-dimensional input is a spectrogram containing three signal components, each of increasingly wider bandwidth. As seen in FIG. 3, a narrow bandwidth component is present in the center of the frequency range. Additionally, a wide bandwidth component is located in the upper frequency range, and a medium bandwidth component is located in the lower frequency range. Noise is also present across the entire frequency range, resulting in a spectrogram that simulates data acquired from an actual communication receiver. The frequency dimension of the test input is 512 elements or frequency bins and the time dimension is 50 segments.

Figure 4A:
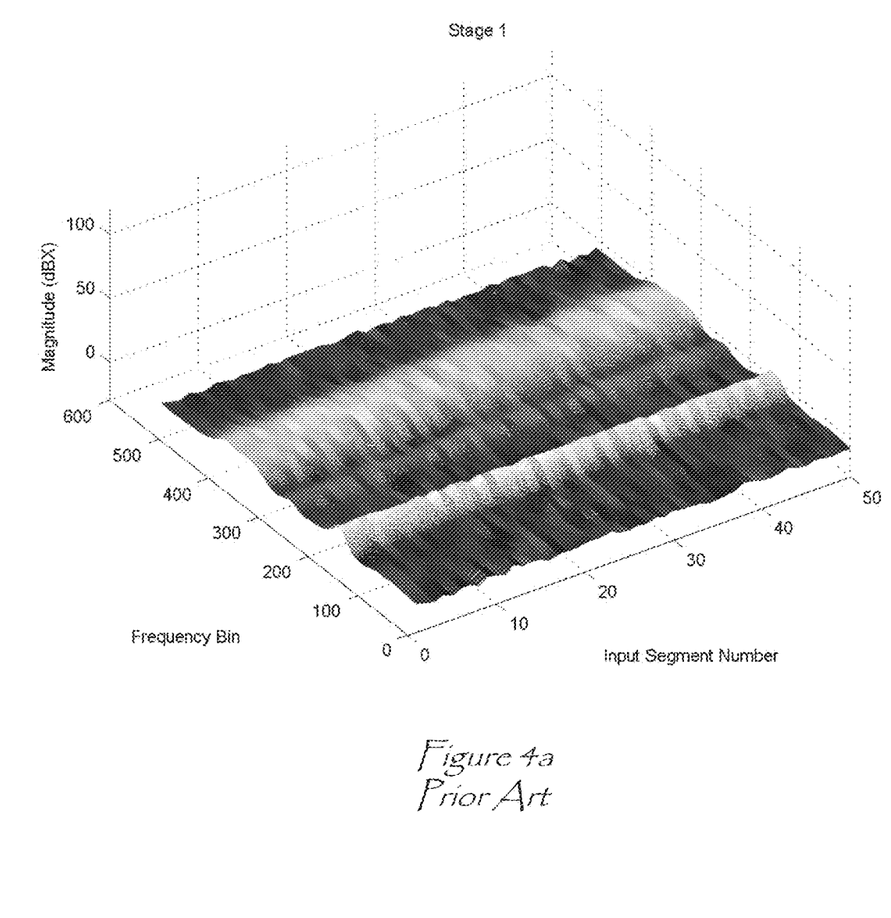
FIG. 4a depicts a first stage output of a prior art 3-stage apparatus.
Figure 4B:
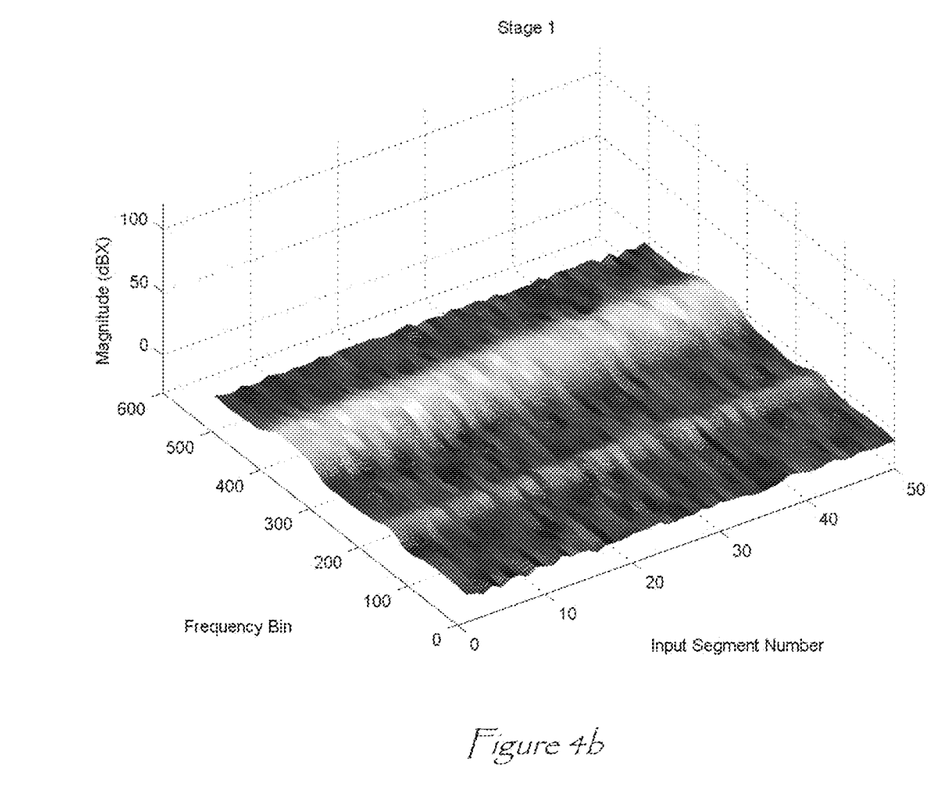
FIG. 4b depicts a first stage output of a 3-stage embodiment of the present invention.

Referring to FIG. 4a, the first stage of the conventional, prior art ABC process performs reasonably well in that the wide bandwidth component is present and the narrow bandwidth component is almost completely attenuated, although some small remnants of signal energy can be seen. Although greatly reduced relative to the input, the medium bandwidth component is still present in sufficient amount due to the non-ideal nature of practical filters. Comparing this result to that of the ABC++ process shown in FIG. 4b, the narrow bandwidth component has been effectively eliminated in stage 1, and the medium bandwidth component is significantly reduced, without reducing the wide bandwidth component.

Figure 5A:
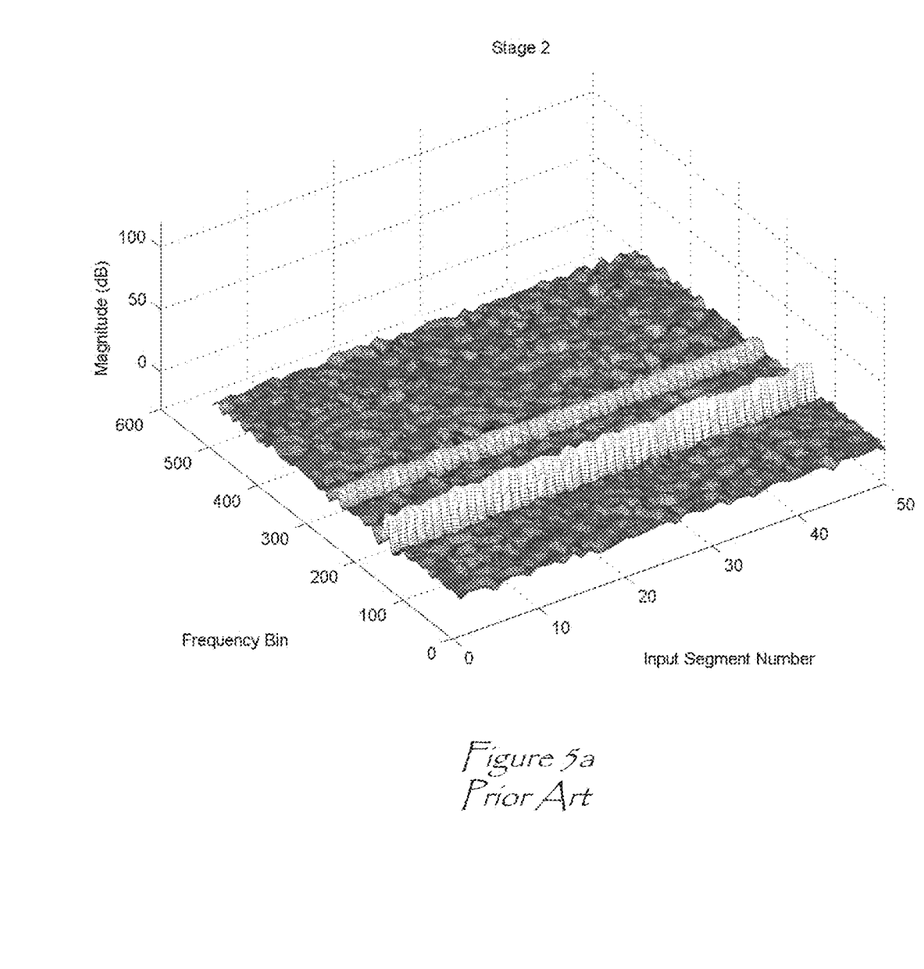
FIG. 5a depicts a second stage output of a prior art 3-stage apparatus.
Figure 5B:
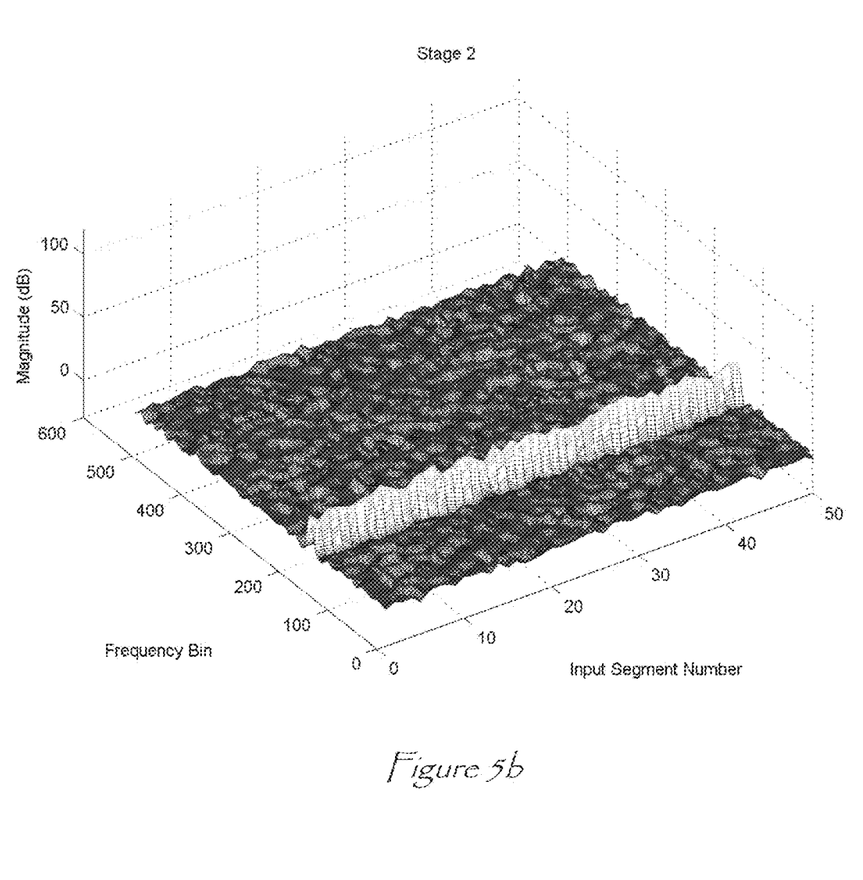
FIG. 5b depicts a second stage output of a 3-stage embodiment of the present invention.

Referring to FIG. 5a and FIG. 5b depicts the stage 2 results. Again, it is readily apparent that although the conventional ABC process of U.S. Pat. No. 5,257,211 does predominantly yield the medium bandwidth signal component in this stage, some of the narrow bandwidth component is still present. For the present invention's ABC++ process, both the wide bandwidth and narrow bandwidth components have been effectively eliminated in this stage.

Figure 6A:
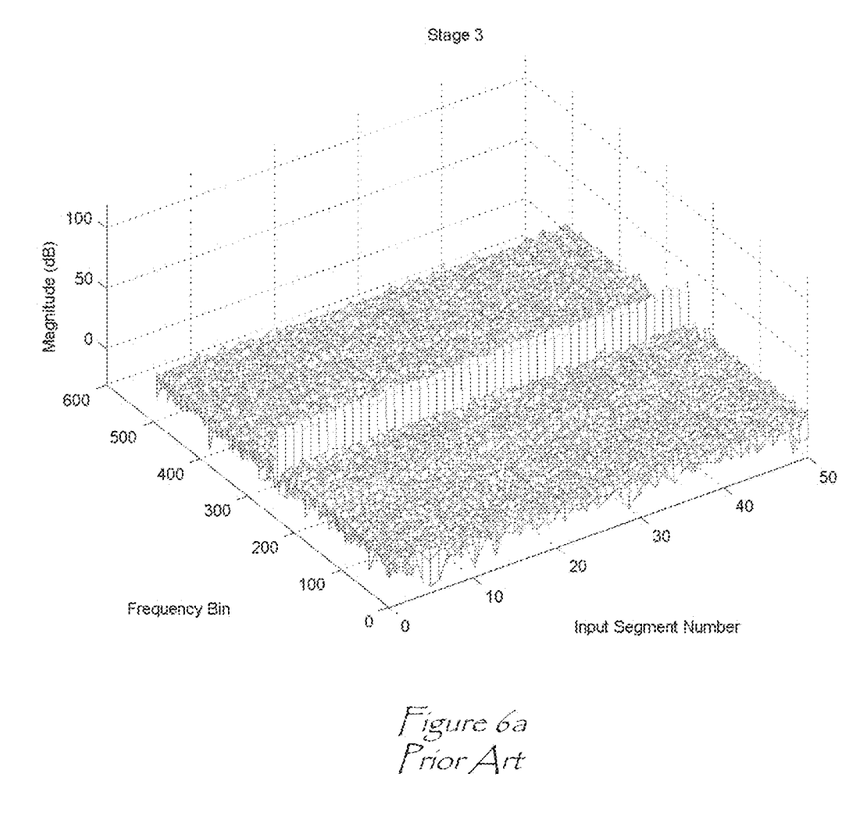
FIG. 6a depicts a third stage output of a prior art 3-stage apparatus.
Figure 6B:
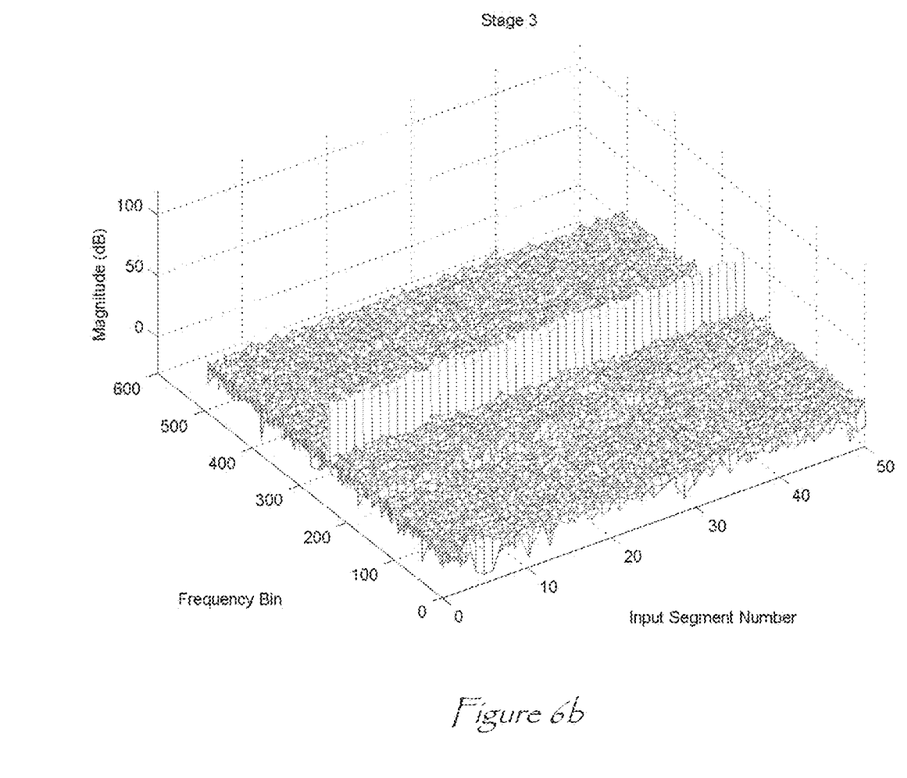
FIG. 6b depicts a third stage output of a 3-stage embodiment of the present invention.

Referring to FIG. 6a and FIG. 6b depicts the stage 3 results, the conventional ABC process very effectively eliminates the wide bandwidth and medium bandwidth components, but has slightly attenuated the narrow bandwidth component. The present invention's ABC++ process likewise eliminates the wide bandwidth and the medium bandwidth components, but has less attenuation of the narrow bandwidth component when compared to the conventional ABC process of U.S. Pat. No. 5,257,211.

Figure 7:
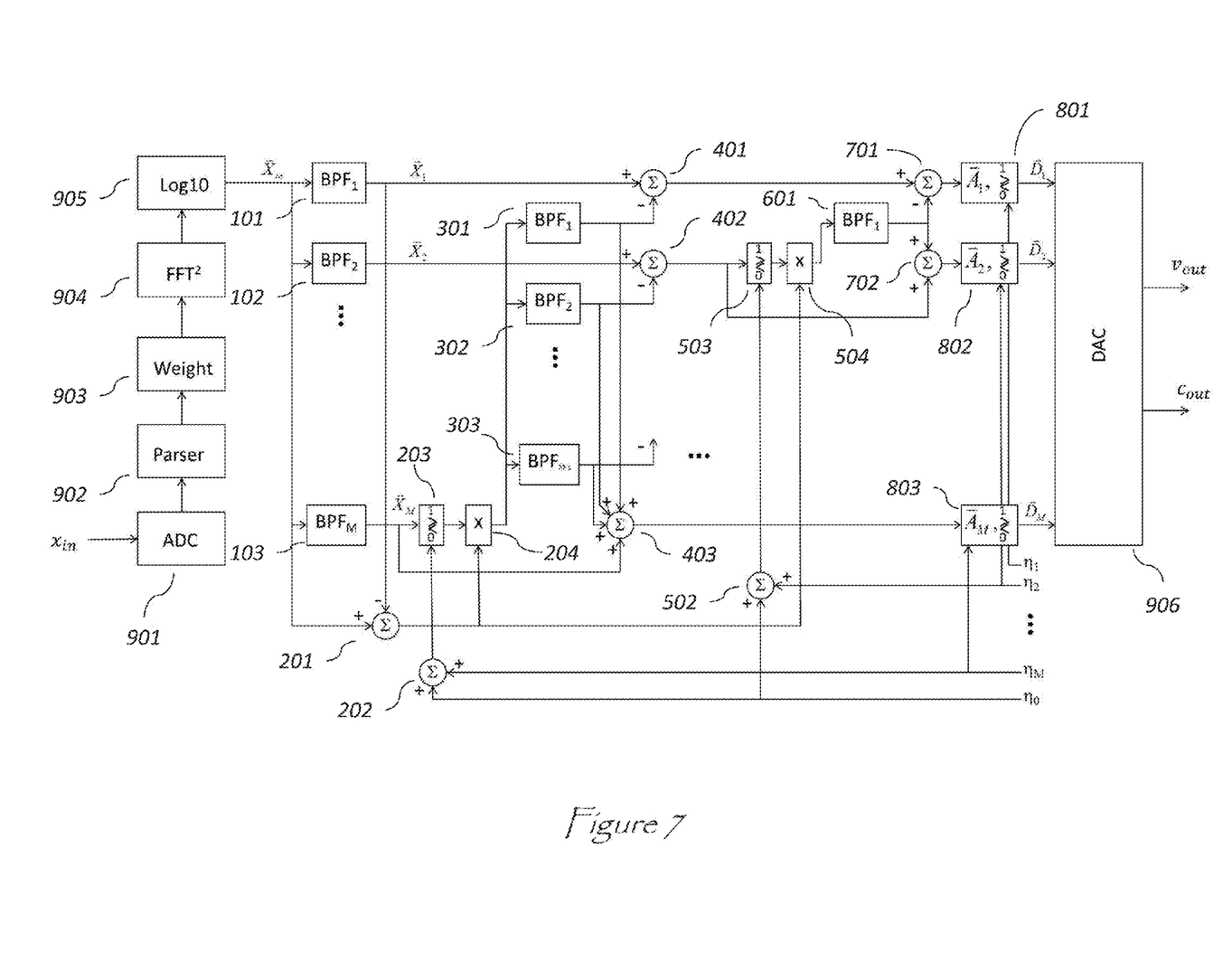
FIG. 7 depicts a functional block diagram of a M-stage embodiment of the present invention.

Referring to FIG. 7 shows a M-order embodiment of the present invention having a quantity of M band-pass filters in the first filter bank, the second filter bank having M−1 band-pass filters, and the third, fourth, etc. each having one less band-pass filter than the prior bank of filters. It follows that the number of multipliers, subtractors, detectors, etc. will be scaled appropriately to the MI-order of the apparatus. It is clearly within the scope of the present invention that the apparatus can be scaled, as just described, to any degree as applications may require.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A detection enhanced adjustable bandwidth signal detection circuit apparatus, comprising:

an analog-to-digital converter into which an analog signal is input, wherein said analog-to-digital converter digitizes said analog signal;

a parser for parsing said digitized signal into sequential vectors of element length N;

a weighting window for weighting said parsed vectors;

a Fourier transformer for transforming and squaring said weighted vectors;

a logarithmic compressor for compressing the amplitude of said Fourier transformed vectors;

a vector processor for signal processing said Fourier transformed vectors; and a digital-to-analog converter having as an input said signal processed vectors and having as an output voltage signals, wherein said voltage signals further comprise video and control signals for inputs to a graphical display means, wherein said vector processor further comprises:
a first filter bank comprising a plurality of filters, all into which said N-element data vectors are input;

a first detector into which the output of a last filter in said first filter bank and the output of a second summer are compared;

a first multiplier into which the output of said first detector is multiplied by the output of a first subtractor, wherein the output of said first multiplier is input into a second filter bank comprising a plurality of filters;

said first subtractor for subtracting the output of a first filter in said second filter bank from the output of said first filter in said first filter bank;

a second subtractor for subtracting the output of a second filter in said second filter bank from the output of a second filter in said first filter bank;

a third subtractor for subtracting the output of said first filter in said first filter bank from said N-element data vector;

a first summer for adding the outputs of said last filter in said first filter bank, the output of said second filter in said second filter bank, and the output of said first filter in said second filter bank;

a second detector into which the output of said third subtractor is with the output of a fourth summer;

a second multiplier into which the output of said second detector is multiplied by the output of said first subtractor;

a final filter bank comprising a first filter into which is input the output of said second multiplier;

a fourth subtractor for subtracting the output of said first filter in said final filter bank from said output of said second subtractor;

a third summer for adding the output of said first filter in said final filter bank with the output of said third subtractor;

a bank of averagers,
into the first of which is input the output of said fourth subtractor and a first threshold coefficient;
into the second of which is input the output of said third summer and a second threshold coefficient; and
into the last of which is input the output of said first summer and a third threshold coefficient;
said second summer adding said third and fourth threshold coefficients; and
said fourth summer adding said second and said fourth threshold coefficients.

2. The circuit apparatus of claim 1 wherein said N-element data vectors are input sequentially.

3. The circuit apparatus of claim 2 wherein the number of said filter banks and the number of said plurality of filters is determined according to the fidelity in signal detection desired.

4. The circuit apparatus of claim 3 wherein the number of filters in an immediately subsequent bank of filters is one less than the number of filters in an immediately prior bank of filters.

5. The circuit apparatus of claim 4 wherein the pass band parameters of all said filters are identical.

6. A method for detection enhanced adjustable bandwidth signal detection, comprising the steps of:
analog-to-digital converting an analog signal of interest so as to digitize said analog signal;
parsing said digitized signal into sequential vectors of element length N;
weighting said parsed vectors;
Fourier transforming and squaring said weighted vectors;
logarithmically compressing the amplitude of said Fourier transformed vectors;
signal processing said Fourier transformed vectors; and
digital-to-analog converting said signal processed vectors so as to produce as an output voltage signals, wherein said voltage signals further comprise video and control signals for inputs to a graphical display means,
wherein said step of signal processing said Fourier transformed vectors further comprises the steps of:
sorting the spectral content of said N-element vectors through a first bank of band-pass filters;
forming the difference between each of said N-element vectors and the output of a selected said band-pass filter;
detecting the output of a selected said band-pass filter against a threshold set by the sum of a plurality of coefficients so as to create a new vector with elements of value 1 or 0;
multiplying said detected output by said difference to form a product vector;
filtering all elements of said product vector through a subsequent bank of band-pass filters;
summing the output of said subsequent bank of band-pass filters with the output of a selected band-pass filter of said first bank of band-pass filters;
forming the difference between selected band-pass filters of said first bank of band-pass filters and selected band-pass filters of said subsequent bank of band-pass filters so as to produce difference vectors;
detecting selected said difference vectors, element-by-element, against a threshold set by the sum of selected scalar coefficients so as to create a new vector with elements of value 1 or 0;
multiplying said detected difference vectors, element-by-element, by said difference between said N-element input vector and the output of a selected said band-pass filter so as to form a subsequent product vector;
filtering all elements of said subsequent product vector through a subsequent bank of band-pass filters;
summing said filtered subsequent product vector with selected said difference vectors;
forming the difference between said filtered subsequent product vector and the vector formed by said difference between said N-element input vector and said output of said selected said band-pass filter; and
averaging selected vectors.

7. The method of claim 6 wherein said N-element data vectors are input sequentially.

8. The method of claim 7 wherein the number of said filter banks and the number of said plurality of filters is determined according to the fidelity in signal detection desired.

9. The method of claim 8 wherein the number of filters in an immediately subsequent bank of filters is one less than the number of filters in an immediately prior bank of filters.

10. The method of claim 9 wherein the pass band parameters of all said filters are identical.

* * * * *